(12) United States Patent
Katagiri et al.

(10) Patent No.: US 8,411,176 B2
(45) Date of Patent: Apr. 2, 2013

(54) IMAGE INPUT DEVICE

(75) Inventors: Tetsuya Katagiri, Kyoto (JP); Sei Koh, Tokyo (JP)

(73) Assignee: Konica Minolta Opto, Inc., Tokyo (JP)

( * ) Notice: Subject to any disclaimer, the term of this patent is extended or adjusted under 35 U.S.C. 154(b) by 16 days.

(21) Appl. No.: 13/260,513

(22) PCT Filed: Mar. 30, 2010

(86) PCT No.: PCT/JP2010/055674
§ 371 (c)(1),
(2), (4) Date: Sep. 26, 2011

(87) PCT Pub. No.: WO2010/116923
PCT Pub. Date: Oct. 14, 2010

(65) Prior Publication Data
US 2012/0026357 A1 Feb. 2, 2012

(30) Foreign Application Priority Data

Apr. 7, 2009 (JP) .................... 2009-092589
Mar. 16, 2010 (JP) .................... 2010-058999

(51) Int. Cl.
*H04N 9/04* (2006.01)
*H04N 9/73* (2006.01)
(52) U.S. Cl. ..................... 348/278; 348/223.1

(58) Field of Classification Search .......... 348/277–280, 348/294, 269–271, 222.1, 223.1; 382/167
See application file for complete search history.

(56) References Cited

U.S. PATENT DOCUMENTS

| 7,274,393 | B2 * | 9/2007 | Acharya ........................ 348/273 |
| 7,864,233 | B2 * | 1/2011 | Kwon et al. ................... 348/272 |
| 2008/0068475 | A1 * | 3/2008 | Choe et al. .................... 348/273 |

FOREIGN PATENT DOCUMENTS

| JP | 2002-142228 | 5/2002 |
| JP | 2007-184805 | 7/2007 |
| JP | 2008-099039 | 4/2008 |

\* cited by examiner

*Primary Examiner* — Chieh M Fan
*Assistant Examiner* — Ahmed A Berhan
(74) *Attorney, Agent, or Firm* — Lucas & Mercanti, LLP

(57) ABSTRACT

Provided is an image input device capable of generating a luminance signal having a high ratio of S/N of an image, and further capable of providing the image with a little uncomfortable feeling even in the night time when the amount of photons is few, wherein, when a visible light luminance signal is relatively low, and an infrared component is predominant in an original image component, for example, correcting color-difference signals with added luminance prevents the color-difference signals with the added luminance from being too high, thereby it becomes possible to perform more natural color reproduction, which is close to original visible light, and gives a little uncomfortable feeling.

5 Claims, 9 Drawing Sheets

FIG. 6a $\underline{a-b}$

| b \ a | 9 | 10 | 11 |
|---|---|---|---|
| 8 | 1 | 2 | ③ |
| 9 | 0 | 1 | 2 |
| 10 | -1 | 0 | 1 |

⇒ 4

FIG. 6b $\underline{(a+b)/2}$

| b \ a | 9 | 10 | 11 |
|---|---|---|---|
| 8 | 8.5 | 9 | 9.5 |
| 9 | 9 | 9.5 | 10 |
| 10 | 9.5 | 10 | 10.5 |

⇒ 2

IMAGE INPUT DEVICE

This Application is a 371 of PCT/JP2010/055674 filed Mar. 30, 2010 which, in turn, claimed the priority of Japanese Patent Application Nos. 2009-092589 filed Apr. 7, 2009 and JP2010-058999 filed Mar. 16, 2010, all three applications are incorporated by reference herein.

TECHNICAL FIELD

The present invention relates to an image input device which processes original image data imaged by an imaging element.

BACKGROUND TECHNOLOGY

Recently, an imaging device which images a nighttime scene in color is known. As an example, in Patent Document 1, a color image reproduction device described below has been disclosed. In such a color image reproduction device, to begin with, a visible image data which is composed of color components of R, G, and B is extracted from an image which has been imaged via pixels including R, G, and B filters. Next, an infrared image data is extracted from the image which has been imaged via pixels including an Ir filter. Next, a first luminance information is extracted by applying HSV conversion to the visible image data, and a second luminance information is extracted from the infrared image data. Next, the first luminance information is weighted by weight coefficient w1, the second luminance information is weighted by weight coefficient w2 (w1+w2=1), and a pseudo-color image is produced.

PRIOR ART DOCUMENT

Patent Document

Patent Document 1: Unexamined Japanese Patent Application Publication No. 2007-184805

SUMMARY OF THE INVENTION

Problems to be Solved by the Invention

Incidentally, because the amount of photons is small during nighttime, there is a problem that the S/N ratio of the captured image becomes low, but with respect to the technique of Patent Document 1, this sort of thing is not being considered. In contrast to this, the applicant has developed an image input device wherein provided are an imaging element, in which at least three kinds of pixels each having spectrum sensitivity different from each other are arranged, to image an original image data including at least three kinds of original image components, and a color space conversion section to convert the aforementioned original image data into a color space including a luminance signal and a chrominance signal, and the aforementioned color space conversion section calculates a first intensity signal, which is obtained by adding the aforementioned original image components, as a luminance signal of the aforementioned color space.

An operation of such image input device will now be specifically described. To begin with, an RGB color signal is converted into a color space which includes luminance signal Y and color-difference signals Cb and Cr. Next, luminance signal Yadd (an example of the first intensity signal) which is obtained by adding image components of Ye, R, IR and W, is calculated as a luminance signal of the color space to be the target of the conversion. Here, because luminance signal Yadd is calculated via an addition processing, it is possible to make noise component low. Next, a smoothing processing is applied to color-difference signals Cb and Cr, and color-difference signals Cbs and Crs are calculated. Here, the noise components included in color-difference signals Cb and Cr are obfuscated, thereby making it possible to improve the S/N ratio of color-difference signals Cb and Cr. Next, by correcting color-difference singals Crs and Cbs in accordance with ratio RT1 of luminance signal Y (RT1=Yadd/Y), and on the basis of the following expressions, color-difference signals Crm and Cbm are determined.

$Crm = Crs \times Yadd/Y$ $Cbm = Cbs \times Yadd/Y$

Finally, from luminance signal Yadd and color-difference signals Crm and Cbm, the RGB color signal is calculated. According to such image input device, even during nighttime when the amount of photons is small, by reducing the noise, a luminance signal with a high S/N ratio can be produced.

Hence, according to such image input device, in an infrared region, because the quantity of visible light from an object is small, the calculated value of color difference is small, and therefore there are cases in which the value of color difference in the infrared region may not be trusted as an image data because the corrected signal becomes submerged by the noise. Also, luminance signal Yadd which is obtained by adding visible light and an infrared component has a larger value than that of luminance signal Y of visible light, and color-difference signals Crm and Cbm have also larger values than those of color-difference signals Cb and Cr of visible light, thus the image, after processing, is bright in color and is more visible. However, in a case in which the infrared component is significantly larger than visible light, color-difference signals Crm and Cbm become excessively high, thus there are cases in which a sense of incongruity may arise when compared to the colors of a photographic subject which is visually recognized by a human.

An object of the present invention is to provide an image input device capable of producing a luminance signal with a high S/N ratio of an image even during nighttime when the amount of photons is small, and also providing an image with less sense of incongruity.

Means to Solve the Problems

Item 1 The image input device includes: an imaging element, wherein at least three kinds of pixels each having spectrum sensitivity different from each other are arranged, for converting a captured object image into an original image data including at least three kinds of original image components; a color signal generation section for generating an RGB color signal from said original image data; and a color space conversion section for converting said RGB color signal into a color space including a luminance signal and a chrominance signal, wherein said color space conversion section calculates a first intensity signal, which is obtained by adding said original image components, as a luminance signal of said color space, further, produces a second intensity signal by converting said RGB color signal into said color space and corrects said chrominance signal in accordance with a ratio of an intensity signal of said first intensity signal with respect to said second intensity signal, and also, modifies said chrominance signal, having been corrected, in accordance with an intensity of visible light included in the captured object image.

According to the present invention, an original image data including at least three kinds of original image components is imaged by the imaging element. After that, the color space conversion section produces the first intensity signal by adding original image components, and calculates the first intensity signal as the luminance signal of the color space. Therefore, even during nighttime when the amount of photons is small, the image input device is capable of producing a luminance signal with a high S/N ratio of an image. Further, the color space conversion section produces a second intensity signal by converting the RGB color signal into the color space, and calculates a ratio of the first intensity signal with respect to the second intensity signal, and corrects the chrominance signal in accordance with this ratio. Therefore, the color space conversion section can produce the chrominance signal and the luminance signal that are balanced in the color space to be the target of the conversion. In addition to that, as an example, in a case in which the visible light luminance signal is comparatively low and the infrared component becomes dominant in an original image component, by modifying the chrominance signal (as an example, color-difference signal of added luminance) by using a predetermined function, the chrominance signal is prevented from becoming excessively high, thus a production of more natural color, which is closer to the original visible light with less sense of incongruity, can be attained. An example of "modification of chrominance signal in accordance with the intensity of visible light" is, as an example, modification of a chrominance signal by using function f(Y) which varies from 0 to 1 in accordance with the value of luminance signal Y, but is not limited to this.

Item 2 The image input device described in Item 1, wherein said color space conversion section, in a case in which said intensity of visible light is lower than a threshold value, modifies said chrominance signal, and in a case in which said intensity of visible light is more than or equal to the threshold value, said color space conversion section does not modify said chrominance signal. As an example, by not carrying out a processing with respect to an area where the infrared component is small, the processing speed can be improved.

Item 3 The image input device described in Item 1, wherein said color space conversion section, based on said original image component, compares an intensity of infrared light and an intensity of visible light, which are included in the captured object image, and in a case in which said intensity of infrared light is higher compared to said intensity of visible light, modifies said chrominance signal. As an example, in the object image to be captured by said imaging element, if an infrared component is more dominant than visible light, by modifying the chrominance signal, the chrominance signal is prevented from becoming excessively high, thus a production of more natural color, which is closer to the original visible light with less sense of incongruity, can be attained.

Item 4 The image input device described in Item 3, wherein said color space conversion section, in a case in which said intensity of visible light is lower than the threshold value and said intensity of infrared light is higher compared to said intensity of visible light, modifies said chrominance signal. As an example, by not carrying out a processing with respect to an area where the infrared component is small, the processing speed can be improved.

Item 5 The image input device described in any one of Items 1 through 4, wherein at least one of at least three kinds of pixels, each having spectrum sensitivity different from each other, has sensitivity in an infrared region. This is to ensure the accuracy of processing by having an infrared component definitely in the signal from said imaging element.

Item 6 The image input device described in any one of Items 1 through 5, wherein, in accordance with the intensities of visible light and non-visible light included in the captured object image, said chrominance signal, having been corrected, is modified. Hereby, chroma suppression processing becomes possible. Chroma suppression processing is chroma correction processing for better color reproduction by suppressing pseudo-color, described in Japanese Patent Application Publication No. 2007-195122 as an example.

Effects of the Invention

According to the present invention, a first intensity signal is generated by adding original image components which compose the original image data, and the first intensity signal is calculated as a luminance signal of the color space to be the target of the conversion. Thereby, even during nighttime when the amount of photons is small, a luminance signal with a high S/N ratio can be produced.

Also, by modifying the chrominance signal appropriately, production of more natural color, which is closer to the original visible light with less sense of incongruity, can be attained.

BRIEF DESCRIPTION OF THE DRAWINGS

FIG. 6a is a table illustrating a noise component obtained via a subtraction processing, and FIG. 6b is a table illustrating a noise component obtained via an addition processing.

DESCRIPTION OF THE PREFERRED EMBODIMENT

Preferred Embodiment 1

Figures 1, 2:
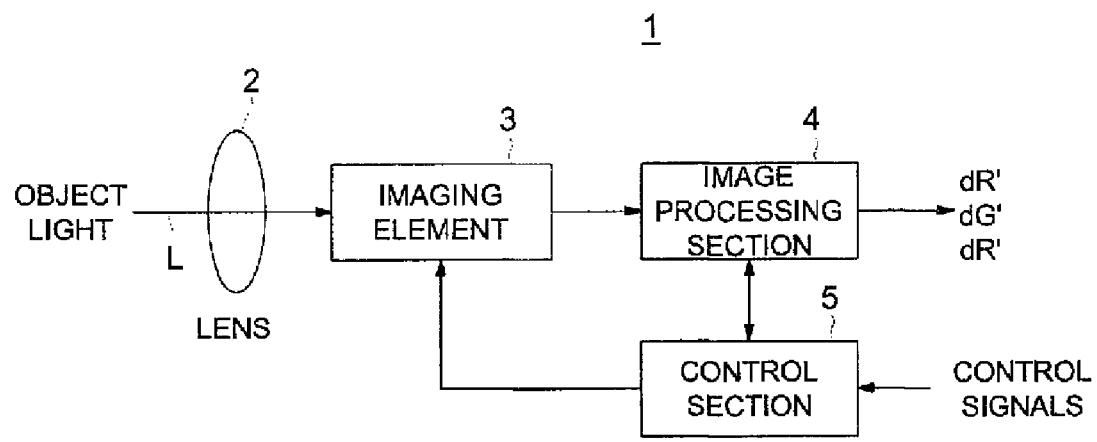
FIG. 1 is a block diagram schematically illustrating image input device 1 according to preferred embodiment 1.
FIG. 2 is a diagram schematically illustrating an arrangement of pixels of imaging element 3.

Hereinafter, image input device 1 according to the preferred embodiments of the present invention will be described. FIG. 1 is a block diagram schematically illustrating image input device 1 according to preferred embodiment 1. As illustrated in FIG. 1, image input device 1 includes lens 2, imaging element 3, image processing section 4, and control section 5. Here, image input device 1 is installed in a vehicle, for example, and is used to image objects around the vehicle.

Lens 2 consists of an optical lens system which captures an optical image of an object and guides it into imaging element 3. As an optical lens system, a zoom lens and a focus lens, and other fixed lens block, and the like, which are arranged in serial along light axis L of the optical image of the object, may be adopted. Also, lens 2 consists of a diaphragm (not shown in the diagram) for adjusting the quantity of transmitted light, a shutter (not shown in the diagram), or the like, and the drive of the diaphragm and the shutter is controlled under the control of control section 5.

Imaging element 3 includes a light receiving section which consists of a PD (photodiode), an output circuit for outputting a signal, to which a photoelectric conversion is applied via the light receiving section, and a drive circuit for driving imaging element 3, and said imaging element 3 generates original image data having a level corresponding to light quantity. Here, as imaging element 3, a variety of imaging sensors such as a CMOS image sensor, a VMIS image sensor, and a CCD image sensor, or the like, may be adopted.

According to the preferred embodiment, imaging element 3 is configured to capture an optical image of an object, and to convert and output a visible color image component via pixels including R, G, and B filters, and to convert and output an infrared image component via pixels including an infrared filter, and to convert and output a luminance image component, which includes a visible luminance image component and an infrared image component, via pixels including no filter.

Image processing section 4 includes memory, or the like, used as an arithmetic circuit and its work area, and converts an original image data output from imaging element 3 into a digital signal by applying an A/D conversion, and, after image processing which will be described later has been carried out, outputs the digital signal to a memory and a display device which are not shown in the diagram.

Control section 5 includes a CPU and a memory for storing programs to be executed by the CPU, and responds to control signals from outside, and governs the entire control of image input device 1.

FIG. 2 is a diagram schematically illustrating an arrangement of pixels of imaging element 3. As illustrated in FIG. 2, in imaging element 3, a unit pixel section 31, including a Ye pixel (a first pixel), an R pixel (a second pixel), an IR pixel (a third pixel), and a W pixel (a fourth pixel) having a sensitivity wavelength band which consists of a visible wavelength region and an infrared wavelength region, are arranged in a matrix state. It should be noted that, [Ye] pixel, as an example, refers to a pixel including a [Ye] filter, and the same applies to other pixels.

In the case of FIG. 2, in unit pixel section 31, the R pixel is arranged in the first row and in the first column, the IR pixel is arranged in the second row and in the first column, the W pixel is arranged in the first row and in the second column, and the Ye pixel is arranged in the second row and in the second column, as such, the R pixel, IR pixel, W pixel, and Ye pixel are arranged in a zigzag manner. However, this is an example, and the R pixel, IR pixel, W pixel, and Ye pixel may be arranged in a zigzag manner by using another pattern.

Because the Ye pixel is including a Ye filter (a first color filter), the Ye pixel outputs image component Ye (an original image component), which is a visible color image component of Ye, and an infrared image component. Because the R pixel includes an R filter (a second color filter), the R pixel outputs image component R (an original image component), which is a visible color image component of R, and an infrared image component. Because the IR pixel includes an IR filter (an infrared filter), the IR pixel outputs image component IR (an original image component), which is an infrared image component. Because the W pixel includes no filter, the W pixel outputs image component W (an original image component), which is a luminance component including a visible luminance image component and image component IR.

Figure 3:
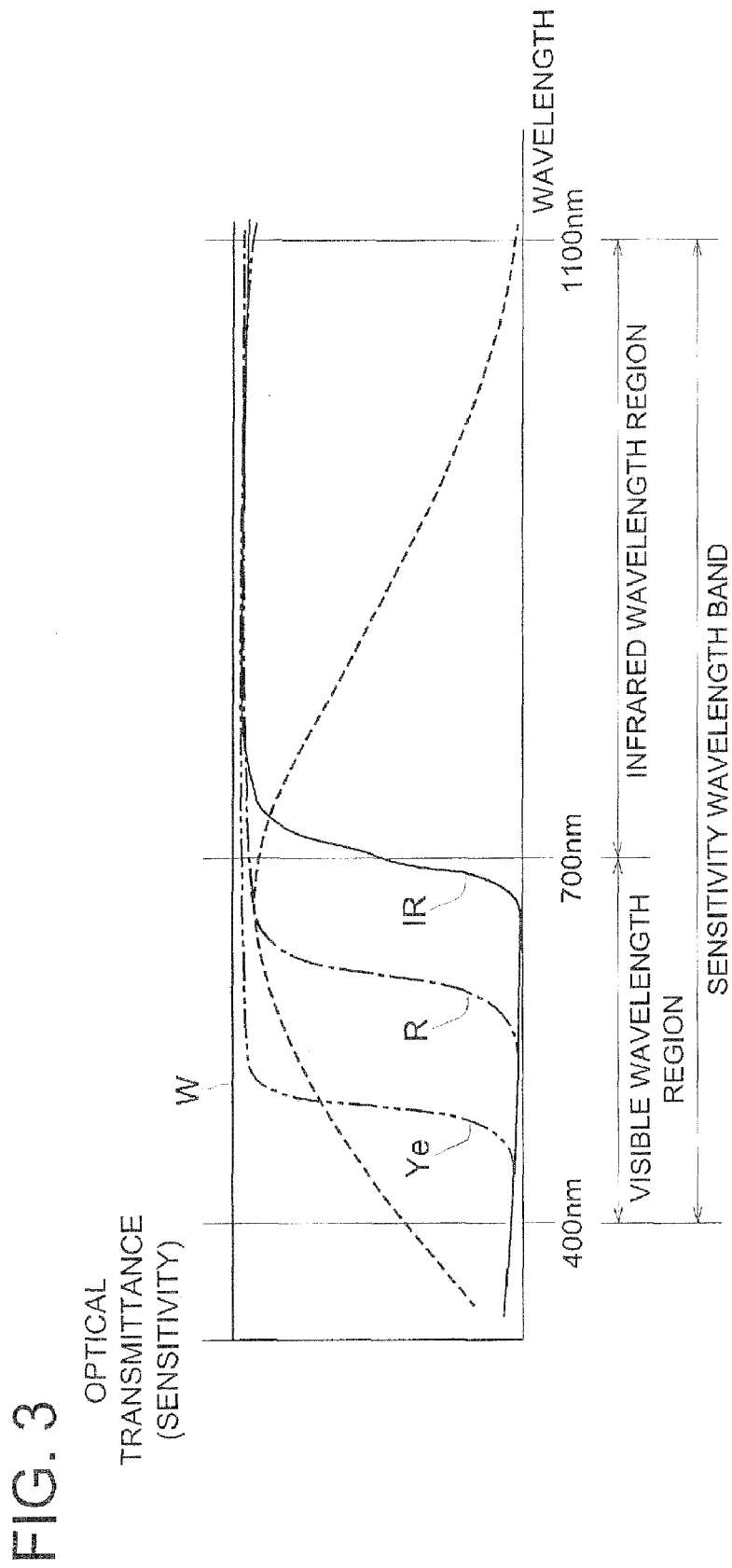
FIG. 3 is a figure illustrating spectral transmission characteristics of Ye, R, and IR filters, and the vertical axis indicates optical transmittance (sensitivity) while the horizontal axis indicates wavelength (nm).

FIG. 3 is a figure illustrating spectral transmission characteristics of Ye, R, and IR filters, and the vertical axis indicates optical transmittance (sensitivity) and the horizontal axis indicates wavelength (nm). It should be noted that a graph illustrated by a dotted line illustrates a spectral transmission characteristic of the pixels in a state in which the filters are removed. This spectral transmission characteristic has a peak near 600 nm, and it is to be noticed that it varies with drawing an upward convex curve. Also, in FIG. 3, 400 nm to 700 nm is referred to as the visible wavelength region, 700 nm to 1100 nm is referred to as the infrared region, and 400 nm to 1100 nm is referred to as the sensitivity wavelength band.

As illustrated in FIG. 3, the Ye filter has a characteristic to transmit light in said sensitivity wavelength band excluding the blue region of the visible wavelength region. Therefore, the Ye filter transmits mainly yellow light and infrared light.

R filter has a characteristic to transmit light in said sensitivity wavelength band excluding the blue and green regions of the visible wavelength region. Therefore, the R filter transmits mainly red light and infrared light.

The IR filter has a characteristic to transmit light in said sensitivity wavelength band excluding the visible wavelength region, namely, the infrared wavelength region. Symbol W illustrates the case when no filter is installed, and all light in the sensitivity wavelength band of pixel is transmitted.

In order to realize other similar characteristics, instead of Ye, R, and IR, Ye, M (magenta)+IR, and C (cyan)+IR (note that M+IR shields green alone, and that C+IR shields red alone) may also be feasible. However, the R pixel, IR pixel, and Ye pixel make it possible to make the spectral transmission characteristics steep, thus, when compared to using an M+IR filter and a C+IR filter, for example, the spectral transmission characteristics are better. In other words, the M+IR filter and the C+IR filter each has a characteristic to shield only the green region, which is a part of the central region of the sensitivity wavelength band, as well as the red region, and therefore, it is rather difficult that those filters have a similar steep spectral transmission characteristics of the R filter, IR filter, and Ye filter. Hence, each of the M+IR filter and the C+IR filter cannot extract RGB image components accurately even after a calculation. Therefore, by constituting imaging element 3 by R pixel, IR pixel, Ye pixel, and W pixel, it is possible to enhance the performance of imaging element 3.

Figure 4:
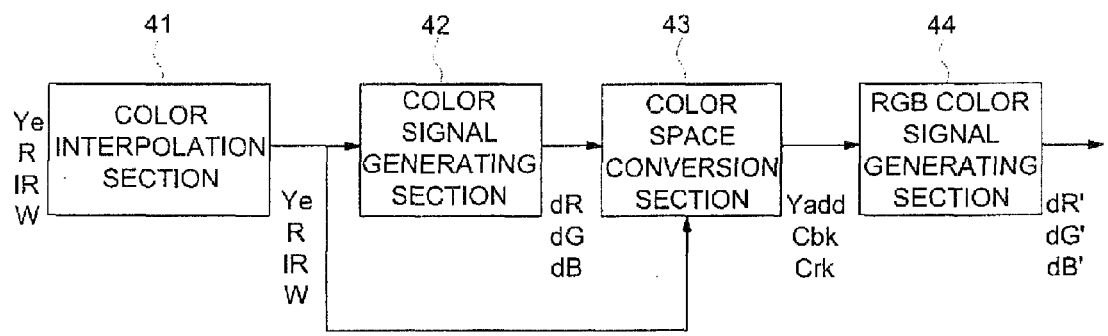
FIG. 4 is a block diagram illustrating a detailed configuration of image processing section 4.

FIG. 4 is a block diagram illustrating a detailed configuration of image processing section 4. Image processing section 4 includes color interpolation section 41, color signal generating section 42, color space conversion section 43, and RGB color signal generating section 44.

Color interpolation section 41 carries out an interpolation processing to interpolate missing image data with respect to each of image component Ye, image component R, image component IR, and image component W, all output from imaging element 3, and make each of image component R, image component IR, image component W and image component Ye as image data which consists of the same number of pixels of the number of pixels of imaging element 3. It should be noted that when missing image data occurs in image components Ye, R, IR, and W, it is because the R pixel, IR pixel, W pixel, and Ye pixel are arranged in a zigzag manner. Also, as an interpolation processing, a liner interpolation processing, as an example, may be adopted.

Color signal generating section 42 generates color signals dR, dG, and dB (RGB color signals) by synthesizing image component Ye, image component R, image component IR, and image component W, to which interpolation processing has been carried out via color interpolation section 41, via expressions (1) below:

$$dR = R - IR$$

$$dG = Ye - R$$

$$dB = W - Ye \quad (1)$$

Color space conversion section 43 converts, as shown in expressions (2), color signals dR, dG, and dB into a color space which includes luminance signal Y (an example of the second intensity signal) and color signals Cb and Cr (an example of a color signal). Here, color signal Cb is referred to as a color-difference signal between blue and luminance signal Y, and color-difference signal Cr is referred to as a color-difference signal between red and luminance signal Y.

$$Y = 0.3dR + 0.59dG + 0.11dB$$

$$Cb = -0.17dR - 0.33dG + 0.5dB$$

$$Cr = 0.5dR - 0.42dG - 0.08db \quad (2)$$

Also, color space conversion section 43 calculates, as shown in expression (3), luminance signal Yadd (an example of the first intensity signal), which is obtained by adding image components Ye, R, IR, and W, as a color space to be the target of the conversion.

$$Yadd = (\tfrac{1}{4}) \times (R + IR + W + Ye) \quad (3)$$

Here, because luminance signal Yadd is calculated via an addition processing, the noise component can be reduced when compared with the case in which luminance signal Yadd is calculated via a subtraction processing.

Figure 5:
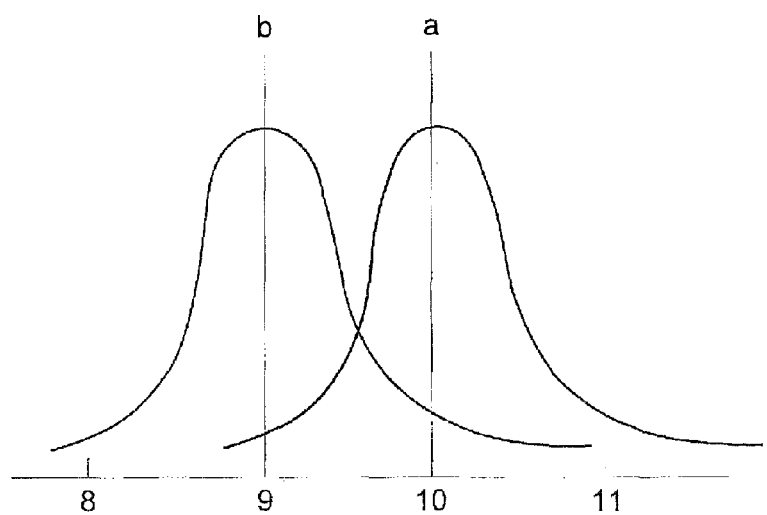
FIG. 5 is a graph illustrating distribution of noise components.

FIG. 5 is a graph illustrating distribution of noise components. FIG. 6a is a table illustrating the noise component obtained via subtraction processing, and FIG. 6b is a table illustrating the noise component obtained via addition processing. In FIG. 5, the horizontal axis indicates the image component, and the vertical axis indicates the value of noise component of the image component.

As an example, noise component "a" indicates a noise component of image component A, and noise component "b" indicates a noise component of image component B. Noise components "a" and "b", with 10 and 9 as the average values, for example, have normal distributions having the same standard deviation.

By calculating a−b simplistically, FIG. 6a is obtained as a result. Also, by calculating (½)×(a+b) simplistically, FIG. 6b is obtained as a result.

In a case in which subtraction processing has been carried out, as illustrated in FIG. 6a, the maximum value of a−b is 3, and the minimum value is −1. On the other hand, in a case in which addition processing has been carried out, as illustrated in FIG. 6b, the maximum value of (a+b)/2 is 10.5, and the minimum value is 8.5. Based on those results, it is to be noticed that, in the case in which addition processing has been carried out, when compared with the case in which subtraction processing has been carried out, the range of noise component becomes narrow and the S/N ratio is substantially improved. It should be noted that FIG. 5 and FIG. 6 are illustrative only, and they do not indicate a value of the actual noise component.

Returning to FIG. 4, color space conversion section 43 may carry out smoothing processing with respect to color-difference signals Cb and Cr which have been calculated via expressions (2). Here, as a smoothing process, as an example, the color-difference signals are processed repeatedly by using a comparatively small size low-pass filter of 5×5, or the like, and a cascaded filtering process, which is a filtering process to perform multi-resolution processing with respect to color-difference signals Cb and Cr, may be adopted. Also, a filtering process using a predetermined size of a low-pass filter of a comparatively large size may be adopted.

Also, processing by an edge preservation filter (a filter which smoothes the signal in a case in which the difference of signal levels between pixels is smaller than a predetermined value, and does not smooth in a case in which it is larger than the predetermined value) may be adopted, by which regions, except edges, are smoothed without blurring with respect to a luminous object. It should be noted that, detection of whether an object is emitting light can be assumed by comparing infrared component and visible light component.

In such a manner, by carrying out a smoothing process with respect to color-difference signals Cb and Cr, the noise component included in color-difference signals Cb and Cr is blurred, thus the S/N ratio of color-difference signals Cb and Cr can be improved.

Also, color space conversion section 43 corrects, as shown in expressions (4), color-difference signals Cr and Cb in accordance with ratio RT1 (RT1=Yadd/Y) of luminance signal Yadd which has been obtained via expression (3) with respect to luminance signal Y which has been obtained via expressions (2), and obtains color-difference signals Crm and Cbm.

$$Cbm = Cb \times Yadd / Y$$

$$Crm = Cr \times Yadd / Y \quad (4)$$

By correcting color-difference signals Cr and Cb by using ratio RT1 in this way, it is possible to calculate, in a balanced manner, the color-difference signal and the luminance signal of the color space to be the target of the conversion. In a case in which this processing is not carried out, when calculating color signals dR', dG', and dB', there is apprehension that problems may arise that the brightness is lost in a case in which luminance signal Yadd is larger than luminance signal Y, and the brightness becomes excessively high in cases in which luminance signal Yadd is smaller than luminance signal Y.

Further, color space conversion section 43 modifies, as shown in expressions (5), color-difference signals Crm and Cbm, which have been obtained via expressions (4), by using a predetermined function f(Y), and obtains color-difference signals Crk and Cbk.

$$Cbk = f(Y) \times Cbm$$

$$Crk = f(Y) \times Crm \quad (5)$$

Figure 7A:
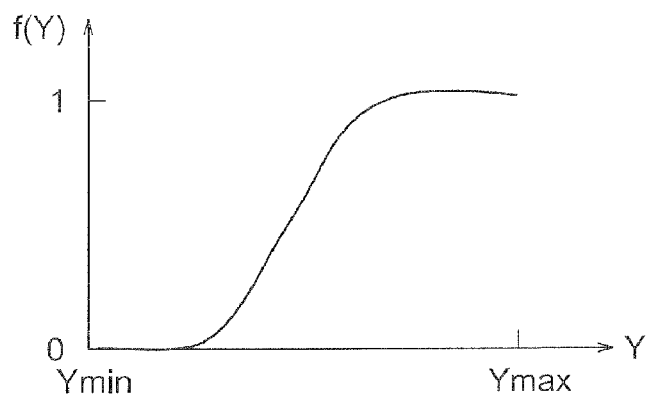
FIG. 7 is a graph illustrating a predetermined function of (Y) which varies from 0 to 1 in accordance with luminance signal Y.
Figure 7B:
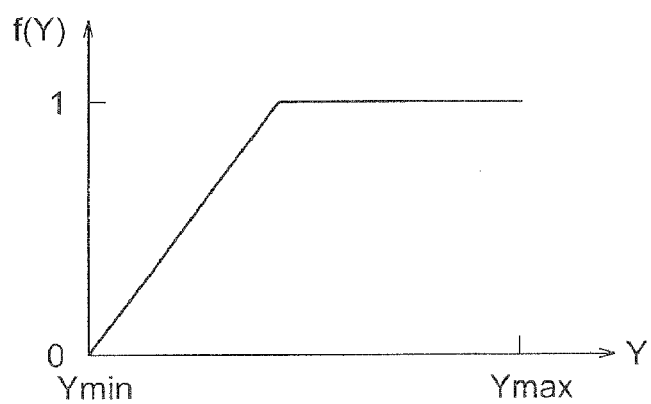
Figure 7C:
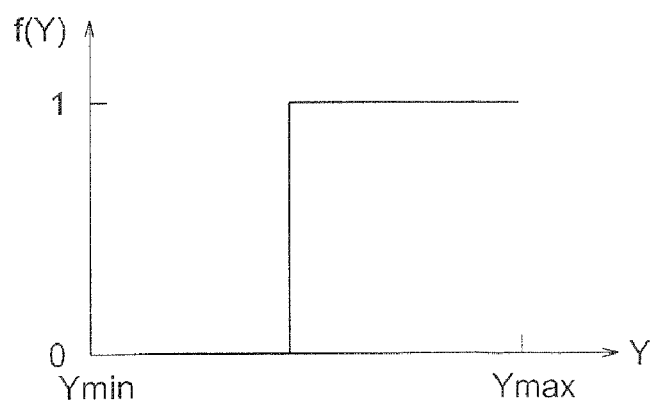

FIG. 7 is a graph illustrating a predetermined function f(Y) which varies from 0 to 1 in accordance with luminance signal Y. Function f(Y) illustrated in FIG. 7a is a function in which, as approaching from Ymin toward Ymax, f(Y) is close to 0 near Ymin and the increase ratio is low, then the increase ratio is increased near an intermediate point, and f(Y) is close to 1 near Ymax and the increase ratio is low. Function f(Y) illustrated in FIG. 7b is a function in which, as approaching from Ymin toward Ymax, f(Y) increases linearly from Ymin until an intermediate point, then f(Y) remains constant (f(Y)=1) from the intermediate point until Ymax. Function f(Y) illustrated in FIG. 7c is a function in which, as approaching from Ymin toward Ymax, f(Y)=0 from Ymin until an intermediate point, then f(Y)=1 from the intermediate point until Ymax. It should be noted that function f(Y) is not limited to these examples, and as an example, a bias may be applied.

As an example, in a case in which, in original image components, the visible light luminance signal is comparatively low and the infrared component is dominant, by modifying color-difference signals Cbm and Crm of addition luminance by using function f(Y) which varies in accordance with luminance signal Y which indicates the intensity of visible light, it is possible to prevent the color signals of addition luminance from becoming excessively high, thus a production of more natural color, which is closer to the original visible light with less sense of incongruity, can be attained.

RGB color signal generating section 44 calculates, by inversely converting expressions (2), color signals dR', dG', and dB' from color-difference signals Crk and Cbk. Specifically, by setting Y in expressions (2) as Yadd, Cb as Cbk, Cr as Crk, and dR, dG, and dB as dR', dG', and dB', then expressions (2) are inversely converted.

It should be noted that color signals dR', dG', and dB' are, because those have been calculated via the above-mentioned processing, substantially accurate color signals when compared with color signals dR, dG, and dB which have been calculated by carrying out subtraction processing with respect to image components Ye, R, IR, and W.

Figure 8:
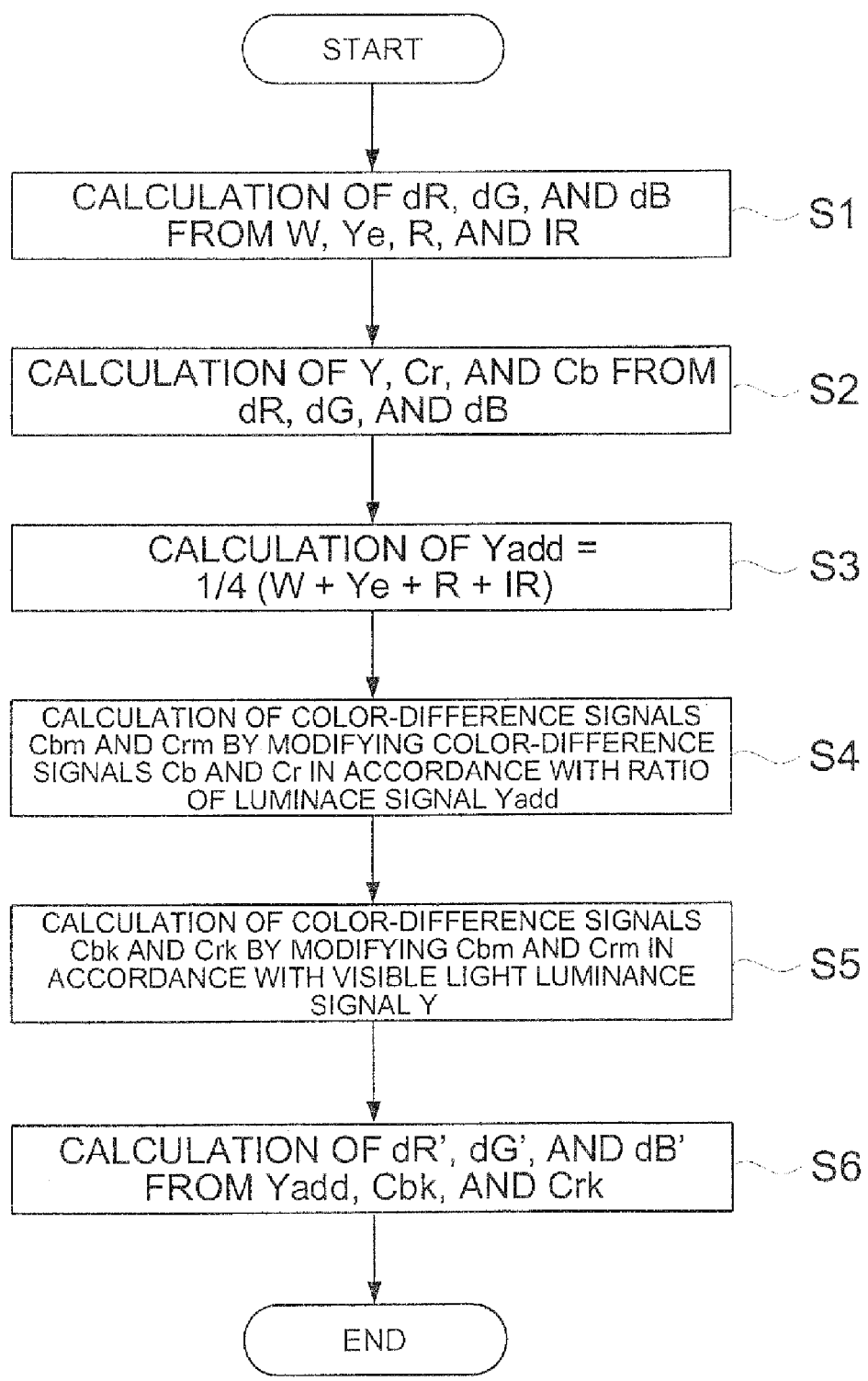
FIG. 8 is a flow chart illustrating an operation of image input device 1 according to preferred embodiment 1.

Next, an operation of image input device 1 will be described. FIG. 8 is a flow chart illustrating an operation of image input device 1 according to preferred embodiment 1. To begin with, control section 5 controls imaging element 3 to image original image data of one frame. By this means, image components Ye, R, IR, and W are obtained.

Here, imaging element 3 outputs image component Ye by the Ye pixel, image component R by the R pixel, image component IR by the IR pixel, and image component W by the W pixel. It should be noted that, in the case in which image input device 1 images a dynamic picture image, control section 5 may control imaging element 3 to image original image data at a frame rate of 30 fps, 60 fps, or the like. Also, in the case in which image input device 1 images a stationary picture image, control section may control imaging element 3 to image original image data when the shutter release buttons is depressed by the user.

Next, via color interpolation section 41, color interpolation processing is carried out with respect to image components Ye, R, IR, and W. Next, color signal generating section 42 calculates color signals dR, dG, and dB by executing calculations of dR=R−IR, dG=Ye−R, and dB=W−Ye shown in expressions (1) (step S1).

Next, color space conversion section 43 calculates luminance signal Y and color-difference signals Cr and Cb, by executing calculations of Y=0.3dR+0.59dG+0.11dB, Cb=−0.17dR−0.33dG+0.5dB, Cr=0.5dR−0.42dG−0.06dB shown in expressions (2) (step S2).

However, color space conversion section 43 may carry out smoothing processing with respect to color-difference signals Cr and Cb.

Next, color space conversion section 43 calculates luminance signal Y by executing calculations of Yadd=(¼)×(R+IR+W+Ye) shown in expression (3) (step S3).

It should be noted that, according to the preferred embodiment, as shown in expression (3), Yadd is calculated by adding R, IR, W, and Ye, but is not limited to this, and as an example, luminance signal Yadd may be calculated by adding those with weights as shown in expression (3').

$$Yadd = \alpha \times R + \beta \times IR + \gamma \times W + \delta \times Ye \quad (3')$$

However, α, β, γ, and δ are weighting coefficients, and α+β+γ+δ=1. Also, as α, β, γ, and δ, as an example, predetermined values may be adopted.

Next, color space conversion section 43 calculates color signals Crm and Cdm by executing calculations shown in expressions (4) (step S4).

Next, color space conversion section 43 executes calculations shown in expressions (5), modifies color-difference signals Crm and Cbm by using function f(Y), and calculates color-difference signals Crk and Cbk (step S5). However, color space conversion section 43 may carry out smoothing processing with respect to color-difference signals Crk and Cbk.

Next, RGB color signal generating section 44 calculates, by inversely converting expressions (2), color signals dR', dG', and dB' from color-difference signals Crk and Cbk (step 6). The image processing is thus completed.

According to image input device 1, because luminance signal Y is calculated by using expression (3), it is possible to calculate luminance signal Yadd with a high S/N ratio even during nighttime. Also, by carrying out a smoothing processing with respect to color-difference signals Cr and Cb, it is possible to calculate color-difference signals Cr and Cb with a high S/N ratio even during nighttime.

Figure 11:
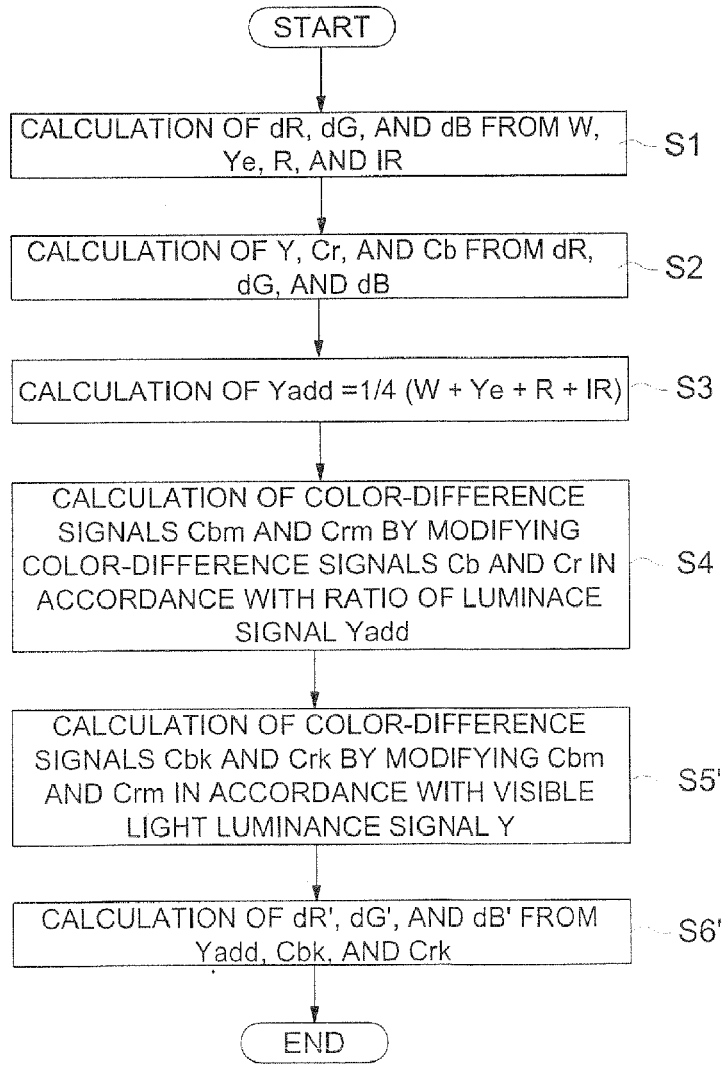
FIG. 11 is a flow chart illustrating an operation of image input device 1 according to a modification example of preferred embodiment 1.
Figure 12:
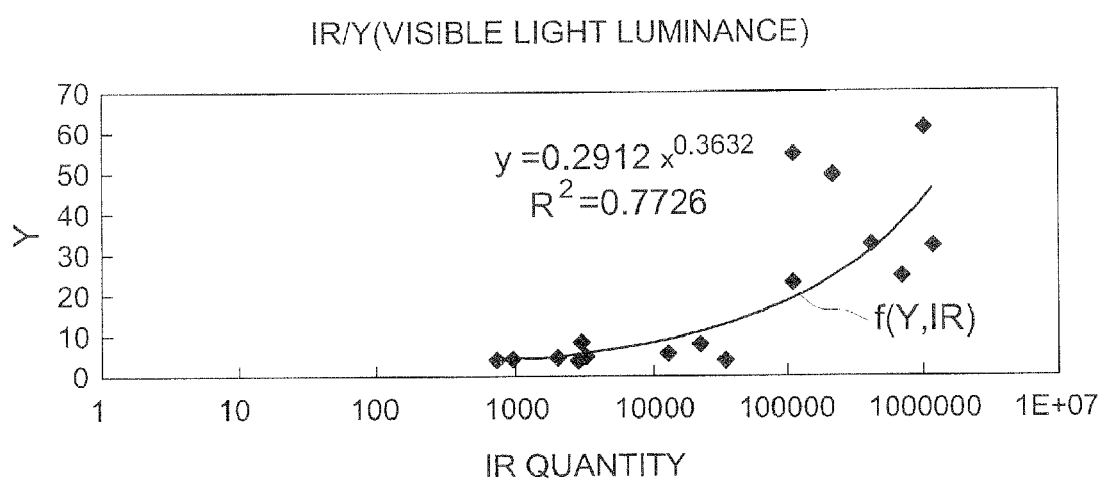
FIG. 12 is a figure obtained by plotting luminance signal Y and infrared light quantity IR in accordance with the incident light.

Next, a modification example according to the preferred embodiment will be described. FIG. 11 is a flow chart illustrating an operation of image input device 1 according to the modification example of preferred embodiment 1. FIG. 12 is a figure obtained by plotting luminance signal Y and infrared light quantity IR in accordance with the incident light, and setting an approximated curve, which shows the relationship, as f(Y, IR). In the flow chart in FIG. 11, explanations on steps S1 to S4 are omitted because those are the same as those in preferred embodiment 1.

In the case in which a dark object is strongly irradiated via an infrared projection, there arises the problem that a noise included in Cb and Cr is increased and becomes noticeable, in a region where the visible component is small and the infrared component is dominant, because Cbm>>Cb and Crm>>Cr in the above-mentioned expressions (4). Hence, in step S5' in FIG. 11, by modifying color-difference signals Crm and Cbm, having been obtained by the above-mentioned expressions (4), by using a predetermined function f(Y, IR), color-difference signals Crk and Cbk are obtained. In other words, in accordance with the intensities of visible light and non-visible light included in the captured object image, said chrominance signal, having been corrected, is modified.

$$Cbk = f(Y, IR) \times Cbm$$

$$Crk = f(Y, IR) \times Crm \quad (5')$$

FIG. 12 is a figure obtained by plotting luminance signal Y (as an example of the intensity of visible light) in the region where the noise has been increased from the actual image and became noticeable and infrared light quantity IR (as an example of the intensity of non-visible light). A correlation is observed between luminance signal Y and infrared light quantity IR. This is expressed by a predetermined function f(Y, IR). With respect to the output of F (Y, IR), by using a table in which the value of the output in the region having a high correlation (near approximation coefficient) is small, and the value is set to 1.0 in other regions, the color, only in the region where the noise is noticeable, can be removed, and therefore, the noise alone becomes unnoticeable, and the color in other regions are not removed.

Further, RGB color signal generating section 44 calculates, by inversely converting expressions (2), color signals dR', dG', and dB' from luminance signal Yadd and color-difference signals Crk and Cbk (step S6'). The image processing is thus completed.

Preferred Embodiment 2

Figure 9:
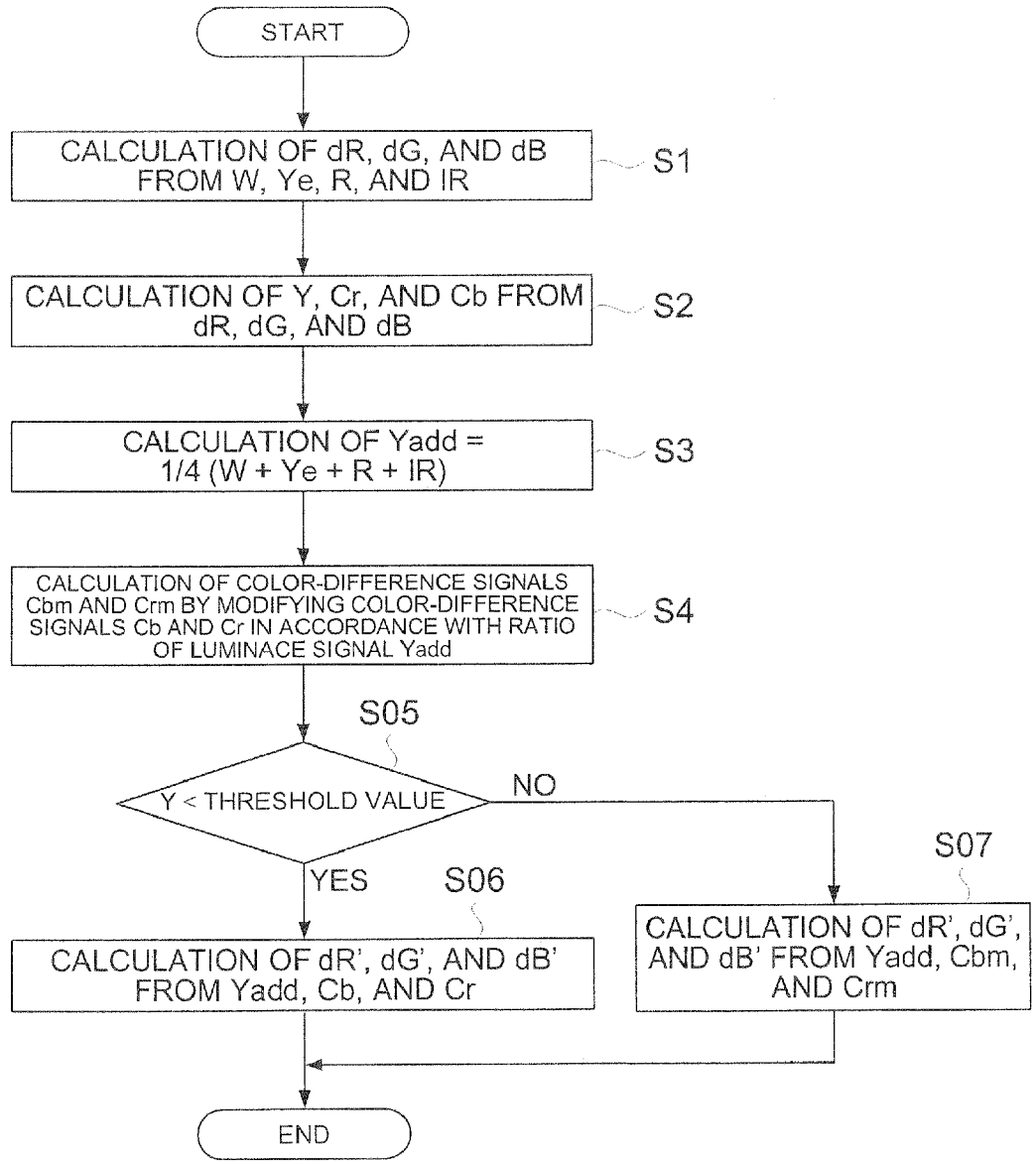
FIG. 9 is a flow chart illustrating an operation of image input device 1 according to preferred embodiment 2.

Next, the image input device according to preferred embodiment 2 will be described. FIG. 9 is a flow chart illustrating an operation of image input device 1 according to preferred embodiment 2.

In the flow chart in FIG. 9, explanations for steps S1 to S4 are omitted because they are the same as those in preferred embodiment 1. In step S05 following step S4, luminance signal Y is compared with a threshold value. If luminance signal Y is less than the threshold value, it is determined that it is an infrared region (infrared light is dominant), and in step S06, color signal dR', dG', and dB' are calculated directly from Yadd, Cb, and Cr without carrying out the conversion of expressions (4). By this, it is possible to shorten the processing time. On the other hand, if luminance signal Y is larger than or equal to the threshold value, it is determined that it is not an infrared region, and in step S07, color signals dR', dG', and dB' are calculated from Yadd, Cbm, and Crm.

Next, a modification example of the preferred embodiment will be described. In a case in which the color signal is modified in the infrared region, by comparing the intensity of infrared light and the intensity of visible light, if the intensity of infrared light is higher, color-difference signals Cbm and Crm are modified. Color-difference signals Cbk and Crk in the infrared region are calculated via expressions (6). In other words, color space conversion section 43 compares, based on the original image components, the intensity of infrared light (image component IR as an example), included in the captured object image, and the intensity of visible light (luminance signal Y as an example), and in a case in which the intensity of infrared light is stronger when compared with the intensity of visible light and the intensity of visible light is smaller than the threshold value, color space conversion section 43 modifies the color-difference values.

Also, in a case in which the intensity of visible light is less than the threshold value, the color-difference signals may be modified, and in a case in which the intensity of visible light is more than or equal to the threshold value, the color-difference values may not be modified. In a case in which the infrared component is more dominant than visible light, by modifying the color-difference values, the color signal is prevented from becoming excessively high, thus a production of more natural color, which is closer to the original visible light with less sense of incongruity, can be attained, and also, by not carrying out a process of modification with respect to the area where the infrared component is small, the processing speed can be improved.

It should be noted that modification via expressions (6) and expressions (5) may be carried out simultaneously.

$$Cbk = f(IRP) \times Cbm$$

$$Crk = f(IRP) \times Crm \quad (6)$$

Figure 10:
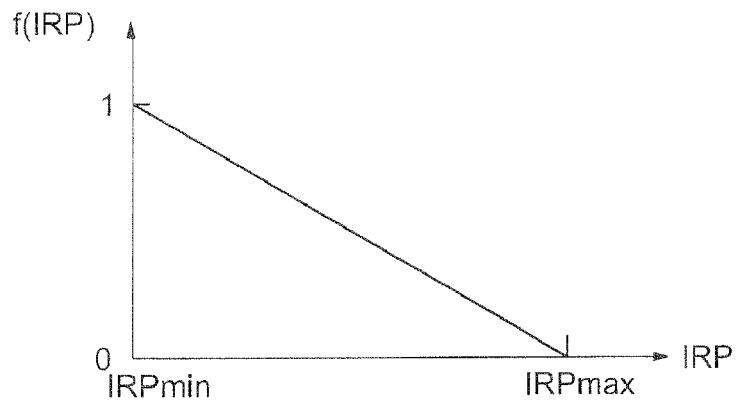
FIG. 10 is a graph illustrating an example of function f(Y) which varies from 0 to 1 in accordance with infrared component IRP.

Here, IRP is the infrared component ratio, and is calculated via expression (7). FIG. 10 is a graph illustrating an example of function f(IRP) which varies from 0 to 1 in accordance with infrared component IRP. Function f(IRP) varies in such a manner that it approaches 1 when infrared component IRP is low, and when infrared content is high, it approaches 0. However, function f(IRP) is not limited to the example of FIG. 10.

$$IRP = IR/(W + Ye + R + IR) \quad (7)$$

INDUSTRIAL APPLICABILITY

The present invention is applicable to a car-mounted camera and a monitoring camera, but the usage is not limited thereto.

DESCRIPTION OF THE SYMBOLS

1: Image input device
2: Lens
3: Imaging element
4: Image processing section
5: Control section
41: Color interpolation section
42: Color signal generating section
43: Color space conversion section
44: RGB color signal generating section

What is claimed is:

1. An image input device comprising:
an imaging element, wherein at least three kinds of pixels each comprising spectrum sensitivity different from each other are arranged, for converting a captured object image into an original image data comprising at least three kinds of original image components;
a color signal generation section for generating an RGB color signal from said original image data; and
a color space conversion section for converting said RGB color signal into a color space comprising a luminance signal and a chrominance signal, wherein said color space conversion section calculates a first intensity signal, which is obtained by adding said original image components, as a luminance signal of said color space, further, produces a second intensity signal by converting said RGB color signal into said color space and corrects said chrominance signal in accordance with a ratio of an intensity signal of said first intensity signal with respect to said second intensity signal, and also modifies said chrominance signal, having been corrected, in accordance with an intensity of visible light included in the captured object image, wherein said color space conversion section, in a case in which said intensity of visible light is lower than a threshold value, modifies said chrominance signal, and in a case in which said intensity of visible light is more than or equal to the threshold value, said color space conversion section does not modify said chrominance signal.

2. The image input device described in claim 1, wherein said color space conversion section, based on said original image component, compares an intensity of infrared light and an intensity of visible light, which are included in the captured object image, and in a case in which said intensity of infrared light is higher compared to said intensity of visible light, modifies said chrominance signal.

3. The image input device described in claim 2, wherein said color space conversion section, in a case in which said intensity of visible light is lower than the threshold value and said intensity of infrared light is higher compared to said intensity of visible light, modifies said chrominance signal.

4. The image input device described in claim 1, wherein at least one of at least three kinds of pixels, each comprising spectrum sensitivity different from each other, has sensitivity in an infrared region.

5. The image input device described in claim 1, wherein, in accordance with the intensities of visible light and non-visible light included in the captured object image, said chrominance signal, having been corrected, is modified.

* * * * *